March 29, 1938.  W. A. KUENZLI  2,112,537
REFRIGERATION
Filed Nov. 23, 1935
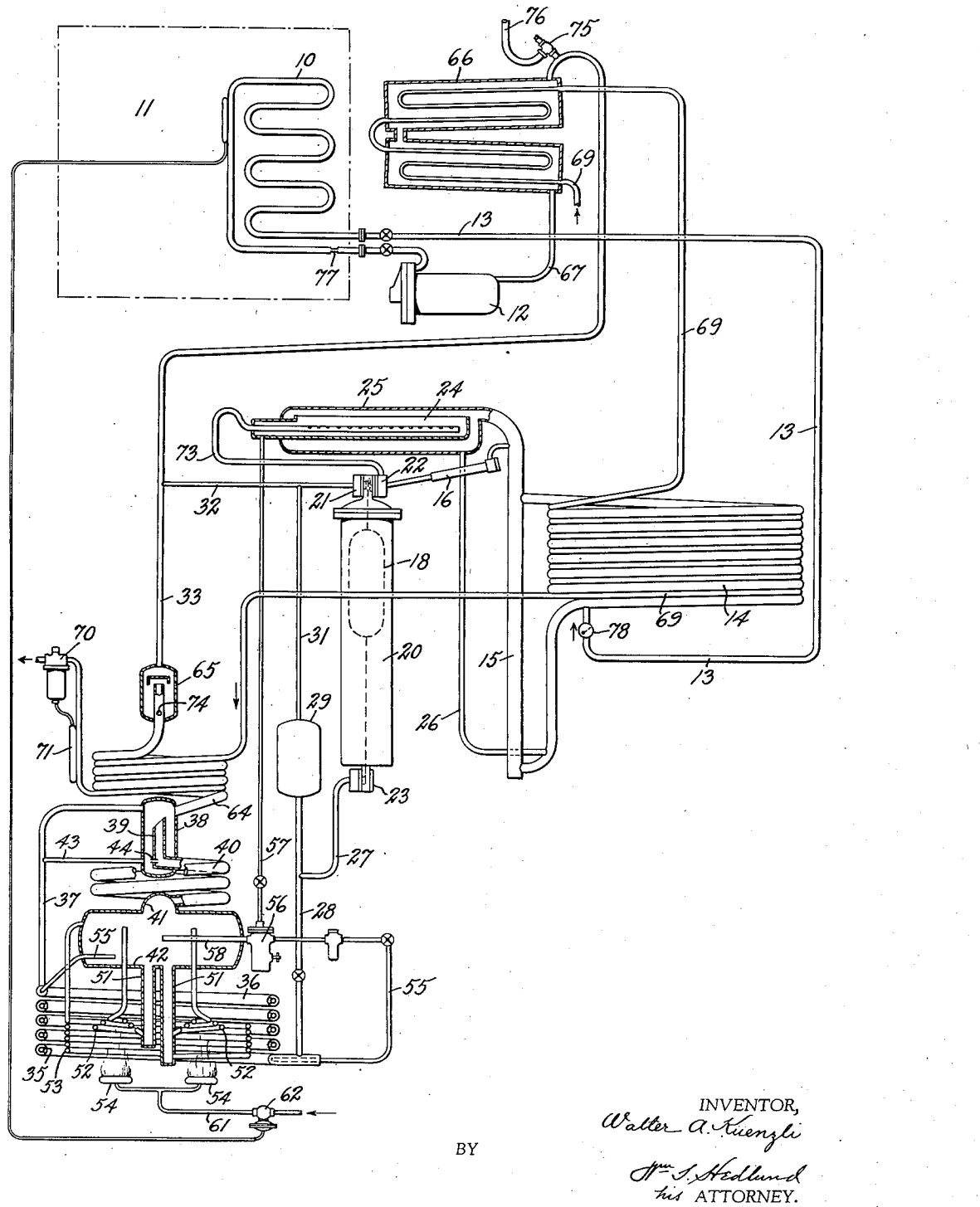
INVENTOR,
Walter A. Kuenzli
BY
Wm. S. Hedlund
his ATTORNEY.

Patented Mar. 29, 1938

2,112,537

UNITED STATES PATENT OFFICE 2,112,537

REFRIGERATION

Walter A. Kuenzli, Evansville, Ind., assignor to Servel, Inc., New York, N. Y., a corporation of Delaware Application November 23, 1935, Serial No. 51,249

31 Claims. (Cl. 62—5)

My invention relates to refrigerating systems and more particularly to absorption refrigerating systems of the continuous type having a low pressure section and a high pressure section, which may be termed a low side and a high side, and in which liquid is transported intermittently from the absorber to the generator. In such systems a device known as a transfer vessel is used, which acts to first connect a given space with the absorber and then with the generator. This space is below the absorber and above the generator so that when it is connected with the absorber and shut off from the generator it receives liquid from the absorber, and when it is connected to the generator and shut off from the absorber the liquid flows from this space into the generator.

In systems of this kind probably the most often suggested actuator for the transfer vessel has been a float—for example, British Patent No. 3427 of 1876 to Nishigawa and Hill, and German Patent No. 54,189 of 1890 to Beetz. At the bottom of its stroke the float closes the connection with the generator, or high pressure side, and opens communication with the absorber, or low pressure side. Liquid flows from the absorber into the float chamber or another vessel associated therewith, and the float is lifted while the liquid accumulates. At the top of the stroke the float changes the valve element to effect connection of the transfer liquid with the generator, or high side, while closing off communication with the absorber, or low side. Thus it will be seen that the generator is likely to receive large quantities of liquid intermittently. This is not disturbing if the size of the generator is large enough so that the intermittent supply has no appreciable effect upon the volume of liquid contained in the generator. On the other hand, the larger the generator the more liquid ammonia must be contained in the system, the more expensive the system, the less flexible the system, and the more severe are applicable code restrictions.

The purpose of my invention is to provide a transfer vessel type system containing a quantity of liquid very much less than what has previously been thought possible with this type of system. In carrying out the invention I preferably provide one or more equalizing or accumulating vessels in addition to the transfer vessel and so arrange the connections that the flow of liquid into the generator approaches constancy despite the intermittent action of the transfer mechanism.

My invention will be understood by reference to the accompanying drawing and the following description of the system shown on the drawing, the drawing constituting a part of the specification and showing more or less diagrammatically a system embodying the invention.

The system includes an evaporator 10 in a compartment 11 to be refrigerated. Any form of evaporator will do. As shown, the evaporator may be supplied with liquid refrigerant, for example, ammonia, through a so-called high side float valve 12. Such a valve is shown, for example, in U. S. Patent No. 1,276,612 to Bechtold et al., granted August 20, 1918. Other forms of control of supply of liquid ammonia to the evaporator may be used. At the inlet end of the evaporator 10 there is a restrictor 77. Instead of the restrictor 77 there may be provided a loaded valve as set forth in Patent 1,891,357 to F. D. Peltier. A device of this nature reduces wear on the float valve, makes the operation of the float valve more uniform, and eliminates sweating and frosting of the conduit connecting the float valve to the evaporator. Due to the pressure drop from the high side to the low side, the liquid ammonia evaporates and takes up heat from the space 11, thus producing refrigeration. The ammonia vapor leaves the evaporator through conduit 13 and enters a tubular absorber 14.

The absorber may comprise, as shown, a coil or other configuration of continuous tubing connected at its ends to a vertical conduit or down-leg 15. The entry of ammonia gas into the absorber from pipe 13 causes upward circulation in the coil, and there is a downflow of liquid in the down-leg 15. The absorption liquid, preferably water, absorbs ammonia in the absorber and forms a strong solution, or what is sometimes called strong liquor or rich liquor. A conduit 16 connects a part of the absorber with the upper part of a transfer vessel 20. Various constructions of transfer vessel may be used, and merely as an illustration and in order to avoid detailed description herein, I cite as an example of transfer vessel that shown in Schurtz U. S. Patent No. 1,740,715 of Dec. 24, 1929. Another form of transfer vessel is shown in Ryden U. S. Patent No. 2,001,797.

Within the transfer vessel is a float 18 which operates valves 21 and 22 at the top and a valve 23 at the bottom of the transfer vessel. Assume that the float 18 has just reached the bottom of its stroke. A transfer takes place whereby valve 23 is closed and valve 21 is closed, and valve mechanism 22 is open, affording communication between the interior of the transfer vessel and the absorber. Liquid can now flow through conduit 16 into the transfer vessel, and it does so, thereby raising the float 18. The pressure is first equalized in the transfer vessel and gas evolved passes through conduit 73 into a receptacle 24 within an extension 25 of the absorber, from which a conduit 26 drains to the lower loop of the absorber.

Vessel 24 is supplied with weak liquid from the generator so that the gas is absorbed. As the liquid flows through conduit 16 into transfer vessel 20 the float 18 rises, and when it reaches the top of its stroke, valve mechanism 22 is closed, shutting off conduits 16 and 73, and valves 21 and 23 are opened, thereby connecting the transfer vessel both by way of liquid communication and gas communication with the generator, or high side. The liquid contained in the transfer vessel can now flow through valve 23, and enters a conduit 27, in turn connected to a conduit 28. Conduit 28 is connected to an equalizing vessel 29.

Vessel 29 is connected by means of a conduit 31 with a connection 32 between a vapor conduit 33, leading to the condenser, and the valve 21. It will be noted that the vessel 29 is not a part of the transfer space since it is always subjected to the pressure of and is always a part of the high side, and does not communicate with the absorber while the transfer vessel is being filled with liquid from the absorber. Conduit 28 connects with the outer tube 35 of a heat exchanger 36. This tube is relatively long and is arranged in the form of a coil around the generator. A suitable heat exchanger comprises an outer tube 71 feet long having an outside diameter of 1 inch and an inside diameter of ⅞ of an inch, and an inner tube having an outside diameter of ⅜ of an inch and an inside diameter of ¼ of an inch.

At the other end of coil 35 is connected a pipe 37 which extends upwardly to an equalizing vessel 38. Vessel 38 is relatively large compared to the size of the piping, and the upper end 39 of an analyzing coil 40 extends vertically upwardly within vessel 38. Coil 40 is connected to the dome 41 of generator 42 in which ammonia vapor is driven out of solution. A pipe 43 forms a cross connection between pipe 37 and vessel 38, and an opening or nipple 44 is placed in the wall of pipe 39 at the level of pipe 43 which is at the lower part of the equalizing vessel 38.

The generator includes several down-legs 51 to which are connected thermosyphon or circulating coils 52 and 53. These coils are heated by one or more burners 54 supplied with gas, or by other heating means. Heat applied to the generator causes expulsion of ammonia from solution, and at the same time the impoverished liquid or weak liquor leaves the generator through conduit 55 which constitutes the inner tube of the heat exchanger 36. The other end of conduit 55 connects to a valve 56, in turn connected by conduit 57 with the absorber receptacle 24. Valve 56 constitutes a dam between the high side and low side. In conduit 55 the high side pressure prevails, whereas in conduit 57 the low side pressure prevails.

Valve 56 may be thermostatically operated by temperature in the generator through the medium of a thermostat tube 58, operating so that the valve opens more on increase in temperature which corresponds to decrease of concentration in the generator, assuming a given pressure. Valve 62 may be placed in the gas line 61 supplying gas to the burner 54, which valve may be controlled in known manner by box temperature or evaporator temperature or other impulse having some relation to the work to be done.

The ammonia vapor expelled in the generator passes through analyzer 40 in which it meets downflowing strong liquor, and thence through vessel 38 and into a rectifier coil 64. Thence the vapor passes into a baffle chamber 65 and into conduit 33 leading to condenser 66. A conduit 67 conducts liquefied ammonia from the condenser to the float valve 12.

The system may be cooled by water or otherwise, and for sake of illustration I have shown a cooling water pipe 69 which passes through the condenser 66 and thence in contact with the absorber coil, and thence in contact with the rectifier coil 64. A valve 70 responsive to outlet water temperature at 71 may be supplied to control the flow of cooling water.

This system operates as follows:

Heat of the gas burners 54 is applied to the pipe coils 52 and 53. This heat causes expulsion of ammonia vapor from a solution of ammonia and water contained in these coils. The expelled vapor causes upward circulation of solution through the coils 52 and 53 into what may be termed a drum or header of the generator 42. A corresponding downflow of solution takes place in the down-legs 51 of the generator to which the lower ends of the coils 52 and 53 are connected. The upward circulation of liquid in the coils 52 and 53 may be caused by a simple form of thermosyphon action in which the columns of liquid in the coils 52 and 53 are made lighter with respect to the columns of liquid in the down-legs 51. However, the coils 52 and 53 may be formed with a sufficiently small internal diameter that gas and liquid cannot pass each other therein, whereby gas bubbles, or accumulations of gas bubbles formed in the coils 52 and 53 rise with a lifting or piston effect on quantities of liquid in the coils between the trapped vapor. Vapor and liquid issuing from the upper ends of the coils 52 and 53 in the drum or header of the generator 42 here separate. The vapor which accumulates in the dome 41 of the generator flows through the analyzer coil 40 into the equalizing vessel 38. In the analyzer 40, the vapor flows in contact with enriched absorption liquid flowing toward the generator in a manner hereinafter described. The function of an analyzer is well understood and need not be here explained in detail. Briefly, however, heat exchange between the hot vapor and the returning enriched solution produces condensation of moisture out of the ammonia vapor and a corresponding expulsion of ammonia vapor from the solution.

Ammonia vapor flows from the upper part of the equalizing vessel 38 into the rectifier coil 64 which is cooled by water flowing in conduit 69. It will be understood that the rectifier 64 may be otherwise cooled, as by providing the coil 64 with heat transfer fins for cooling by air. In the rectifier, further condensation of water vapor occurs, the condensate draining back into the equalizing vessel 38, through an orifice 44 into the analyzer coil 40 and thence back to the generator 42. From the upper end of the rectifier 64, ammonia vapor flows into the baffle chamber 65. Here the direction of vapor flow is reversed so that entrained liquid is caused to be separated out of the vapor, the separated liquid draining from the chamber 65 through an orifice 74 and thence through the rectifier 64, equalizing vessel 38, and the analyzer 40 back to the generator 42.

It will be understood that the baffle chamber 65 may be omitted. Its purpose is to prevent liquid which might pass through the rectifier from passing to the condenser. It has been found to be unnecessary in actual practice if the apparatus is otherwise properly constructed.

From the baffle chamber 65, ammonia vapor flows through conduit 33 into the condenser 66 which is cooled by water flowing through conduit 69. The conduit 33 may be provided with a safety relief valve 75 to relieve dangerously high pressure in the system by way of a conduit 76 which is open to atmosphere at a suitable point, or which opens within an enclosure safeguarded against escape of fumes.

In the condenser 66, ammonia vapor is condensed to liquid which flows through conduit 67 into the high side float vessel 12. From the latter, liquid ammonia flows through the restrictor or valve 77 and then to the evaporator 10.

The generator 42, the analyzer 40, the equalizing vessel 38, the rectifier 64, the baffle chamber 65, the conduit 33, the condenser 66, and the float chamber of the high side float valve 12, are included in what is conveniently referred to as the high side or high pressure side of the system. The pressure in this side of the system is determined by the rate of expulsion of vapor in the generator with respect to the rate of condensation in the condenser. It will be understood that if ammonia were continuously expelled in the generator and no ammonia were condensed in the condenser, the pressure would continue to rise. It is for this reason that it is preferable to provide the safety relief valve 75 in a water cooled system which is subject to dangerously excessive pressure increase on failure of cooling water supply. It will be understood that the condenser 66 may be air cooled, thus limiting the pressure rise. Also, the rectifier 64 may be air cooled and the condenser water cooled, the air cooled rectifier automatically limiting the rise in pressure to that corresponding to the condensing pressure of ammonia at the temperature of the cooling air.

The evaporator 10 and the absorber 14 are in what is generally referred to as the low side or low pressure side of the system which is segregated from the high pressure side in the present system, by the float valve 12, a weak liquid control valve 56, and valves associated with the transfer device 20.

Weakened absorption liquid, that is, absorption liquid from which ammonia vapor has been expelled as previously described, flows from the lower part of the header of the generator 42 through a conduit 55, forming an inner passage of the liquid heat exchanger 36, to a control valve 56. This control valve admits weakened absorption liquid into the conduit 57 responsive to a suitable factor as, for instance, the temperature of the generator 42, as previously described. The weakened absorption liquid flows through conduit 57 into a tray or open top vessel 24 located within the extension 25 of the absorber. Liquid overflows from the tray 24 into the vessel 25, forming the absorber extension, and thence flows through conduit 26 into the absorber proper, which comprises a coil 14 having its lower and upper ends connected to a vertical conduit 15. The upper end of the conduit 15 is connected to the upper part of the absorber extension 25. Thus, conduit 26, conduit 15, and the absorber coil 14 fill with liquid until the level of the connection of overflow conduit 16 to the vertical conduit 15 is reached, whereupon liquid overflows through conduit 16 into the transfer vessel 20 when the valve 22 is open.

The evaporator 10 is connected to the lower part of the absorber coil 14 by means of a conduit 13, so that the pressure in the evaporator is maintained at a desired low value by absorption of vapor into weakened absorption liquid in the absorber. The absorber is cooled by water flowing in conduit 69. It will be understood that the absorber may be cooled by air or other suitable cooling medium. It will be understood that the pressure in the absorber and evaporator, that is, in the low side of the system, is determined by the concentration of absorption liquid in the absorber and the temperature of the absorber. The pressure in the low side may be decreased by increasing the flow of weak solution through the absorber or decreasing the temperature of the absorber.

Liquid ammonia evaporates in the evaporator 10 at a temperature corresponding to the pressure in the low side of the system maintained by the absorber 14. The vapor flows through conduit 13 into the lower part of the absorber coil 14 in which the vapor bubbles upwardly through the absorption liquid and is thereby absorbed. Introduction of vapor into the lower end of the absorber coil 14 produces an upward flow of liquid in this coil, since the liquid column therein is lightened with respect to a corresponding liquid column in the vertical conduit 15. A check valve 78 in conduit 13 prevents backing up of liquid from the absorber through this conduit which may occur due to pulsations created by the intermittent operation of the transfer device. The pressure in the low side of the system is maintained at a sufficiently low value that evaporation of liquid ammonia occurs in the evaporator 10 at a temperature below that of the cooling medium, such as water or air, thus producing a refrigerating effect in the space 11 in which the evaporator 10 is situated.

Assuming that the float 18 has just reached the lower part of the transfer vessel 20, closing valves 21 and 23, and opening valve 22, vapor flows from the transfer vessel 20 through valve 22 and conduit 73 and bubbles into liquid in the tray 24, being thereby absorbed. The pressure vessel 20 is now segregated from the high side of the system, by the closed valves 21 and 23, and the pressure therein has become the same as that in the low side of the system due to the absorption of vapor into absorption liquid in the tray 24. Thereupon, enriched absorption liquid flows through conduit 16 and valve 22 into the transfer vessel 20. As the level of liquid in the transfer vessel 20 rises, the float 18 is carried upwardly until it reaches the upper part of the transfer vessel, or what may be termed the upper end of its stroke, whereupon the float causes valve 22 to close and valves 21 and 23 to open, preferably in the order named. Thereupon, the transfer vessel 20 is segregated from the low side of the system by the closed valve 22 and connected to the high side of the system by means of valves 21 and 23. Valve 21 affords communication by way of conduit 32 with vapor in the high side of the system, which flows through conduit 32 into the transfer vessel 20, causing the pressure therein to rise until equal to that in the high side of the system. Thereupon, enriched absorption liquid flows from the transfer vessel 20 through the valve 23 and conduit 27 into conduit 28 by gravity. This flow of liquid occurs quickly due to the higher level of liquid in the transfer vessel than in the high pressure side of the system. As liquid empties from the transfer vessel 20, the float 18 descends to what may be termed the lower end of its stroke, at which it causes valves 21 and 23 to close and valve 22 to open. During the time that the transfer vessel 20 is emptying into the high pressure side of the system, liquid is prevented from flowing through conduit 16 on account of the closed valve 22, but this period is short compared to the length of the period during which the valve 22 is open, so that flow of absorption liquid from the absorber into the transfer vessel 20 is substantially continuous, and is a steady flow corresponding to the admission of weakened absorption liquid to the absorber from the generator by way of the weak liquid control valve 56.

On the other hand, a large quantity of liquid, accumulated in the transfer vessel 20, is intermittently discharged into the high side of the system in a short period of time. Since liquid in the high side of the system is contained in the liquid heat exchanger 36 and the generator 42, it will be understood that without provision for otherwise taking care of the situation, there will be intermittent fluctuations or surges of liquid level in the generator. The disadvantages of these intermittent fluctuations can be somewhat offset by providing a generator of sufficiently large liquid capacity that the amount of liquid intermittently transferred into the generator by the transfer device is relatively small when compared to the amount of liquid in the generator as a whole. This has heretofore been the practice, and this practice is accompanied by the disadvantages of a large generator, and a large quantity of liquid in the high pressure side of the system.

Looking at this problem in a more general way, it will be seen that there can be obtained a substantially steady flow of weakened absorption liquid from the generator to the absorber. In accordance with this invention there is also obtained a substantially steady flow of enriched absorption liquid from the absorber to the generator. This is accomplished by providing intermediate the transfer device and the generator one or more chambers having sufficient volume to receive the quantity of liquid intermittently transferred by the transfer device, and introducing restriction to flow of liquid intermediate said chamber or chambers and said generator. Referring to the drawing, there is provided a first vessel 29, which may be referred to as an equalizing vessel, to the lower part of which is connected the conduit 28. The conduit 27 from the lower part of the transfer device 20 is connected to conduit 28 just below the equalizing vessel 29. In order that the vessel 29 may be at the same pressure as that in the high side of the system, a conduit 31 is connected from the upper part of the vessel 29 to conduit 32, which in turn is connected to the vapor conduit 33. The lower end of conduit 28 is connected to the lower end of the concentric tube liquid heat exchanger 36. The heat exchanger 36 is constructed and arranged with sufficient length and tube diameters as to provide a desired resistance to flow of liquid therethrough in its path of flow toward the generator. When the transfer vessel 20 empties through conduit 27 into conduit 28, as previously described, liquid will flow upwardly through conduit 28 into the equalizing vessel 29 on account of the resistance to downward flow through conduit 28 provided by the liquid heat exchanger 36. Liquid will then flow from the equalizing vessel 29 through conduit 28 at a substantially steady rate through the liquid heat exchanger 36 and conduit 37 into a second equalizing vessel 38. Liquid will flow into the second equalizing vessel 38 through conduit 43 or both conduit 43 and the upper end of conduit 37, depending upon the rate of flow through conduit 37 with respect to the rate of flow through the orifice 44 from the lower part of the equalizing vessel 38 into the upper end of the analyzer coil 40. If liquid enters the equalizing vessel 38 at a rate greater than the rate of flow through the orifice 44, as may occur upon boiling of liquid in the liquid heat exchanger, liquid will rise in the equalizing vessel 38 and remain available for flow through the orifice 44 into the analyzer 40 and thence into the generator 42. It will now be understood that the liquid heat exchanger 36 constitutes a liquid flow restriction with respect to flow of liquid from the transfer device 20 into the high side of the system, and that the orifice 44 constitutes a liquid flow restriction with respect to flow of liquid through conduit 37.

By this means flow of liquid into the generator is transformed into flow at a steady rate from intermittent flow created by the transfer device. Considering the system broadly, it will be seen that there is provided a generator of small liquid holding capacity, for instance, 450 cubic inches, that the system is provided with absorption liquid including a quantity in excess of the combined capacities of the absorber and generator and interconnecting conduits, and that this excess quantity, for instance, 127 cubic inches, is accumulated alternately in the low pressure side of the system and in an accumulation chamber or in accumulation chambers other than the generator in the high pressure side of the system, such as vessel 29 having a capacity of 150 cubic inches, and that, by providing suitable flow restriction between the accumulation chamber and the generator, there is obtained a substantially steady flow of liquid throughout the absorption liquid circuit except for the localized intermittent flow produced by an intermittent transfer device.

What is claimed is:

1. In an absorption refrigeration system of a continuous two-pressure type, a device for intermittently transferring absorption liquid in a path of flow from an absorber in the low pressure side to a generator in the high pressure side of the system, and means for transforming the intermittent transfer of liquid caused by said transfer device into a substantially continuous flow of liquid into the generator.

2. An absorption refrigeration system including a generator, a condenser, an evaporator, members interconnecting said parts for flow of refrigerant fluid therethrough in series respectively, a device for causing intermittent flow of liquid therefrom in the path of flow from said absorber to said generator, and means for equalizing the flow of liquid between said device and said generator.

3. In an absorption refrigeration system of a continuous two-pressure type having a device for intermittently transferring absorption liquid in a path of flow from the low pressure to the high pressure side of the system, an absorption liquid circuit including said transfer device, an absorber in the low pressure side, a generator, a liquid heat exchanger, and a liquid accumulation chamber in the high pressure side of the system arranged to accommodate variable quantities of liquid therein.

4. An absorption refrigeration system including a generator, an absorber, means for conducting liquid from said absorber to said generator including a liquid heat exchanger and a device for intermittently causing transfer of liquid therethrough from a region of relatively low pressure to a region of relatively high pressure, and a liquid accumulation chamber communicating with said liquid conducting means intermediate said transfer device and said heat exchanger and arranged to accommodate variable quantities of liquid therein.

5. In an absorption refrigeration system including a generator, a condenser, an evaporator, and an absorber, said evaporator and absorber being in a low pressure portion of the system, and the generator and condenser being in a higher pressure portion of the system, means for circulating absorption liquid between said generator and absorber including a liquid heat exchanger having a relatively narrow path for flow of liquid and a device for intermittently causing transfer of liquid from a region of low pressure to a region of high pressure in its path of flow from the absorber to the generator, and a liquid accumulation chamber for absorption liquid in the high pressure part of the system arranged to accommodate variable quantities of liquid therein.

6. In an absorption refrigeration system of a continuous two-pressure type, a device for intermittently transferring absorption liquid in a path of flow from an absorber in the low pressure side to a generator in the high pressure side of the system, and a plurality of accumulation chambers for absorption liquid wholly in the high pressure side of the system and arranged to accommodate variable quantities of liquid therein.

7. In an absorption refrigeration system of a continuous two-pressure type, a device for intermittently transferring absorption liquid in a path of flow from an absorber in the low pressure side to a generator in the high pressure side of the system, a plurality of accumulation chambers for absorption liquid wholly in the high pressure side of the system and arranged to accommodate variable quantities of liquid therein, and a liquid heat exchanger intermediate said accumulation chambers.

8. An absorption refrigeration system including a generator, an absorber, means for conducting liquid from said absorber to said generator and including a device for intermittently causing transfer of liquid therethrough from a region of relatively low pressure to a region of relatively high pressure, and a plurality of liquid accumulation chambers arranged to accommodate variable quantities of liquid therein and communicating with said liquid conducting means intermediate said transfer device and said generator.

9. An absorption refrigeration system including a generator, an absorber, means for conducting liquid from said absorber to said generator including a liquid heat exchanger and a device for intermittently causing transfer of liquid therethrough from a region of relatively low pressure to a region of relatively high pressure, and a plurality of liquid accumulation chambers arranged to accommodate variable quantities of liquid therein and communicating with said liquid conducting means intermediate said transfer device and said generator and on opposite sides of said heat exchanger.

10. An absorption refrigeration system including a coil type generator, an absorber, means for conducting liquid from said absorber to said generator including a concentric pipe coil heat exchanger and a transfer vessel for intermittently causing transfer of liquid therethrough from a region of relatively low pressure to a region of relatively high pressure, a liquid accumulation chamber communicating with said liquid conducting means intermediate said transfer device and said heat exchanger, and a second accumulation chamber communicating with said conducting means intermediate said heat exchanger and said generator, both of said chambers being arranged to accommodate variable quantities of liquid therein.

11. In an absorption refrigeration system including a generator, a condenser, an evaporator, and an absorber, said evaporator and absorber being in a low pressure portion of the system, and the generator and condenser being in a higher pressure portion of the system, means for circulating absorption liquid between said generator and absorber including a device for intermittently causing transfer of liquid from a region of low pressure to a region of high pressure in its path of flow from the absorber to the generator, and a plurality of liquid accumulation chambers for absorption liquid in the high pressure part of the system arranged to accommodate variable quantities of liquid therein.

12. In an absorption refrigeration system including a generator, a condenser, an evaporator, and an absorber, said evaporator and absorber being in a low pressure portion of the system, and the generator and condenser being in a higher pressure portion of the system, a transfer vessel for intermittently causing transfer of liquid from a region of low pressure to a region of high pressure in its path of flow from the absorber to the generator, said generator having a relatively small liquid holding capacity, and a plurality of liquid accumulation chambers for absorption liquid in the high pressure part of the system intermediate said transfer vessel and said generator and arranged to accommodate variable quantities of liquid therein.

13. An absorption refrigeration system including a generator, an absorber, means for conducting liquid from said absorber to said generator and including a device for intermittently causing transfer of liquid therethrough from a region of relatively low pressure to a region of relatively high pressure, a liquid accumulation chamber communicating with said liquid conducting means intermediate said transfer device and said generator and arranged to accommodate variable quantities of liquid therein, and means for restricting flow of liquid in said liquid conducting means intermediate said liquid accumulation chamber and said generator.

14. An absorption refrigeration system including a generator, an absorber, means for conducting liquid from said absorber to said generator and including a device for intermittently causing transfer of liquid therethrough from a region of relatively low pressure to a region of relatively high pressure, a liquid accumulation chamber arranged to accommodate variable quantities of liquid therein and communicating with said liquid conducting means intermediate said transfer device and said generator, and means for restricting flow of liquid in said liquid conducting means intermediate said liquid accumulation chamber and said generator comprising a liquid heat exchanger.

15. An absorption refrigeration system including a generator, an absorber, means for conducting liquid from said absorber to said generator and including a device for intermittently causing transfer of liquid therethrough from a region of relatively low pressure to a region of relatively high pressure, a liquid accumulation chamber arranged to accommodate variable quantities of liquid therein and communicating with said liquid conducting means intermediate said transfer device and said generator, and means for restricting flow of liquid in said liquid conducting means intermediate said liquid accumulation chamber and said generator comprising a concentric tube type liquid heat exchanger arranged in the form of a coil.

16. An absorption refrigeration system including a generator comprising a header and a plurality of heating coils, an absorber, means for conducting liquid from said absorber to said generator and including a device for intermittently causing transfer of liquid therethrough from a region of relatively low pressure to a region of relatively high pressure, a liquid accumulation chamber communicating with said liquid conducting means intermediate said transfer device and said generator, and means for restricting flow of liquid in said liquid conducting means intermediate said liquid accumulation chamber and said generator comprising a concentric tube liquid heat exchanger arranged in the form of a coil and surrounding said generator heating coils.

17. In an absorption refrigeration system including a generator, a condenser, an evaporator, and an absorber, said evaporator and absorber being in a low pressure portion of the system, and said generator and condenser being in a higher pressure portion of said system, means for circulating absorption liquid between said generator and absorber including a device for intermittently causing transfer of liquid from a region of low pressure to a region of high pressure in its path of flow from the absorber to the generator, a liquid accumulation chamber for absorption liquid in the high pressure part of the system arranged to accommodate variable quantities of liquid therein, and means for restricting flow of liquid from said accumulation chamber.

18. In an absorption refrigeration system of a continuous two-pressure type, a device for intermittently transferring absorption liquid in a path of flow from an absorber in the low pressure side to a generator in the high pressure side of the system, an accumulation chamber for absorption liquid in the high pressure side of the system arranged to accommodate variable quantities of liquid therein, and means for restricting flow of liquid from said accumulation chamber.

19. In an absorption refrigeration system including a generator, an absorber, means for conducting liquid from said absorber to said generator including a device for intermittently causing transfer of liquid therethrough from a region of relatively low pressure to a region of relatively high pressure, a plurality of liquid accumulation chambers arranged to accommodate variable quantities of liquid therein and communicating with said liquid conducting means intermediate said transfer device and said generator, and means for restricting flow of liquid from each of said accumulation chambers.

20. In an absorption refrigeration system including a generator, an absorber, means for conducting liquid from said absorber to said generator including a device for intermittently causing transfer of liquid therethrough from a region of relatively low pressure to a region of relatively high pressure, a plurality of liquid accumulation chambers arranged to accommodate variable quantities of liquid therein and communicating with said liquid conducting means intermediate said transfer device and said generator, and means for restricting flow of liquid from one of said accumulation chambers comprising a liquid heat exchanger.

21. In an absorption refrigeration system including a generator, a condenser, an evaporator, and an absorber, said evaporator and absorber being in a low pressure portion of the system, and the generator and condenser being in a higher pressure portion of the system, means for circulating absorption liquid between said generator and absorber including a device for intermittently causing transfer of liquid from a region of low pressure to a region of high pressure in its path of flow from the absorber to the generator, a plurality of liquid accumulation chambers for absorption liquid in the high pressure part of the system arranged to accommodate variable quantities of liquid therein, and means for restricting flow of liquid from each of said accumulation chambers.

22. In an absorption refrigeration system including a generator, a condenser, an evaporator, and an absorber, said evaporator and absorber being in a low pressure portion of the system, and the generator and condenser being in a higher pressure portion of the system, means for circulating absorption liquid between said generator and absorber including a device for intermittently causing transfer of liquid from a region of low pressure to a region of high pressure in its path of flow from the absorber to the generator, a plurality of liquid accumulation chambers for absorption liquid in the high pressure part of the system, and means comprising a liquid heat exchanger for restricting flow of liquid from each of said accumulation chambers.

23. In an absorption refrigeration system of a continuous two-pressure type, a device for intermittently transferring absorption liquid in a path of flow from an absorber in the low pressure side to a generator in the high pressure side of the system, a plurality of accumulation chambers for absorption liquid, means comprising a liquid heat exchanger for restricting flow of liquid from one of said accumulation chambers, and a member having a small orifice for restricting flow of liquid from another of said accumulation chambers.

24. In a method of refrigeration which includes generation, condensation, evaporation, and absorption of refrigerant fluid in a continuous circuit, that improvement which consists in withdrawing enriched absorption liquid from a place of absorption, intermittently transferring withdrawn liquid to a further place, and causing a substantially steady flow of liquid from said further place to a place of generation.

25. A method of refrigeration which includes evaporating refrigerant fluid by transfer of heat thereto, conducting the vapor to a place of absorption, conducting absorption liquid in contact with the vapor at said place of absorption, withdrawing enriched absorption liquid from said place of absorption, intermittently transferring withdrawn liquid from a region of low pressure to a region of high pressure, and causing substantially continuous flow of transferred fluid to a place of heating.

26. In a method of refrigeration which includes generation, condensation, evaporation, and absorption of a refrigerant fluid, that improvement which resides in flowing enriched absorption liquid from a place of absorption to a place of transfer, intermittently causing transfer of liquid from said place of transfer toward a place of generation, steadily flowing weakened absorption liquid from said place of generation to said place of absorption, and equalizing the rate of flow of said intermittently transferred absorption liquid to said place of generation.

27. In a method of refrigeration with the aid of a system in which refrigerant vapor is expelled from solution in absorption liquid by heating in a generator, condensed to liquid in a condenser, evaporated in an evaporator, and absorbed into weakened absorption liquid in an absorber, that improvement which resides in flowing weakened absorption liquid from said generator to said absorber, flowing enriched absorption liquid from said absorber to a place of transfer, intermittently transferring absorption liquid from said place of transfer, accumulating said transferred liquid and restricting flow of liquid from the place of accumulation to said generator to equalize flow of absorption liquid.

28. In a method of refrigeration with the aid of a system in which refrigerant vapor is expelled from solution in absorption liquid by heating in a generator, condensed to liquid in a condenser, evaporated in an evaporator, and absorbed into weakened absorption liquid in an absorber, that improvement which resides in flowing weakened absorption liquid from said generator to said absorber, flowing enriched absorption liquid from said absorber to a place of transfer, intermittently transferring absorption liquid from said place of transfer, accumulating said transferred liquid in a plurality of places and restricting flow of liquid from said places of accumulation to said generator to equalize flow of absorption liquid.

29. In a method of refrigeration with the aid of a system in which refrigerant vapor is expelled from solution in absorption liquid by heating in a generator, condensed to liquid in a condenser, evaporated in an evaporator, and absorbed into weakened absorption liquid in an absorber, that improvement which resides in flowing weakened absorption liquid from said generator to said absorber, flowing enriched absorption liquid from said absorber to a place of transfer, intermittently transferring absorption liquid from said place of transfer, accumulating said transferred liquid, flowing liquid from the place of accumulation to said generator in heat exchange relation with weakened absorption liquid in a heat exchanger, and utilizing said heat exchanger to so resist flow of liquid as to equalize the flow of absorption liquid.

30. In a method of refrigeration with the aid of a system in which refrigerant vapor is expelled from solution in absorption liquid by heating in a generator, condensed to liquid in a condenser, evaporated in an evaporator, and absorbed into weakened absorption liquid in an absorber, that improvement which resides in flowing weakened absorption liquid from said generator to said absorber, flowing enriched absorption liquid from said absorber to a place of transfer, intermittently transferring absorption liquid from said place of transfer, accumulating said transferred liquid in a first place of accumulation, flowing liquid from said first place of accumulation to a second place of accumulation in heat exchange relation with weakened absorption liquid in a heat exchanger, utilizing said heat exchanger to restrict flow of liquid between said places of accumulation and also restricting flow of liquid from said second place of accumulation to said generator to equalize the flow of absorption liquid.

31. In a method of refrigerating with an absorption system of a two-pressure type including a generator, an absorber, a liquid heat exchanger, and a device for intermittently transferring enriched absorption liquid from the low pressure to the high pressure side of the system, that improvement which consists in utilizing absorption liquid in excess of the desired operating capacity of said generator, absorber, and heat exchanger, and accumulating excess liquid alternately in said transfer device and a place in the high pressure side of the system other than the generator.

WALTER A. KUENZLI.